Aug. 6, 1968  W. R. McPHERSON  3,395,480
FISH HOOKS AND LURES
Filed Oct. 12, 1965  2 Sheets-Sheet 1
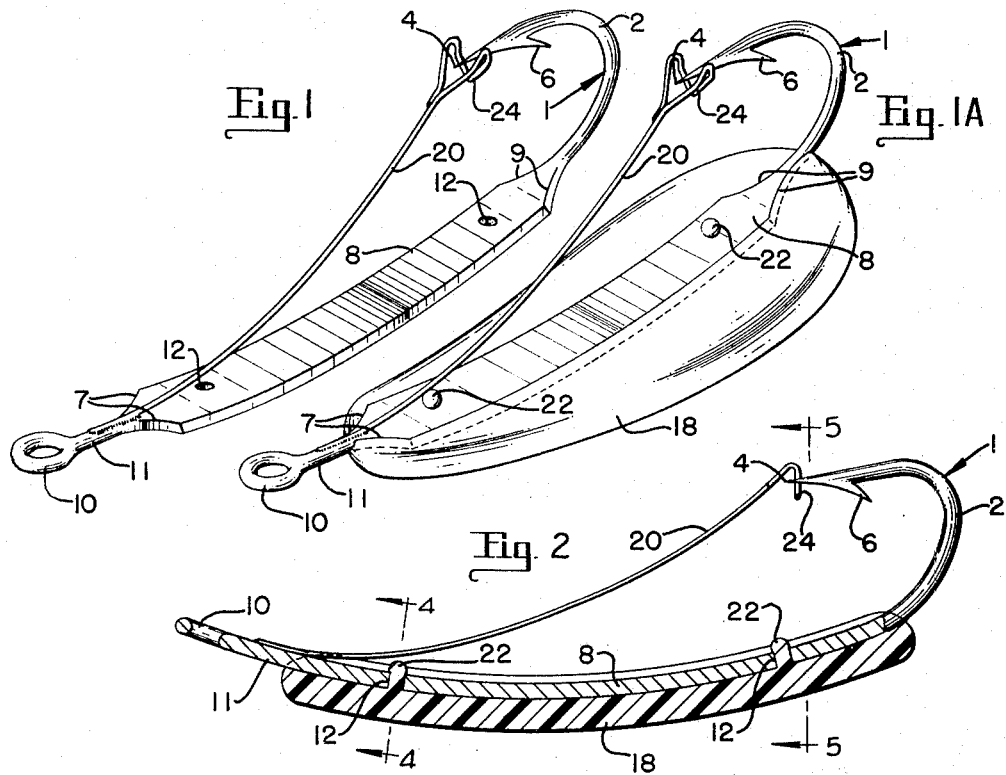
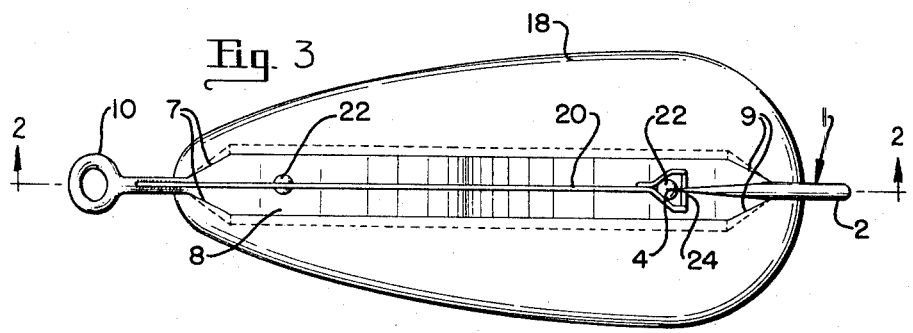
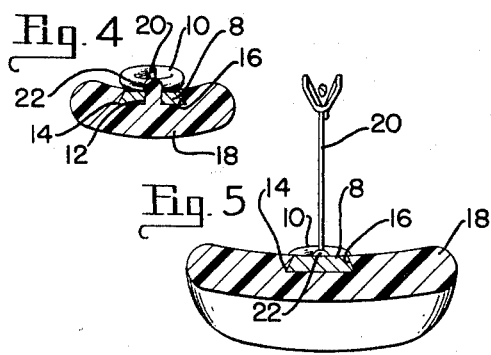
WILLIAM R. McPHERSON
INVENTOR.
BY
Wayland D. Keith
HIS AGENT Aug. 6, 1968
W. R. McPHERSON
3,395,480
FISH HOOKS AND LURES
Filed Oct. 12, 1965
2 Sheets-Sheet 2
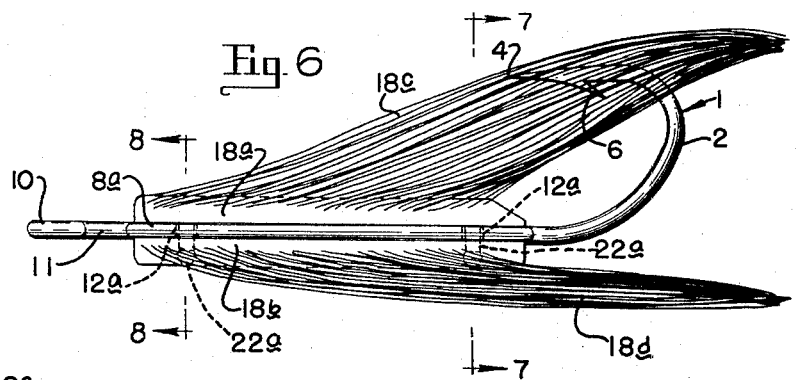
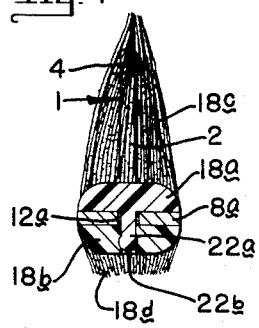
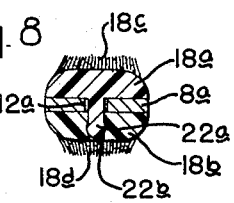
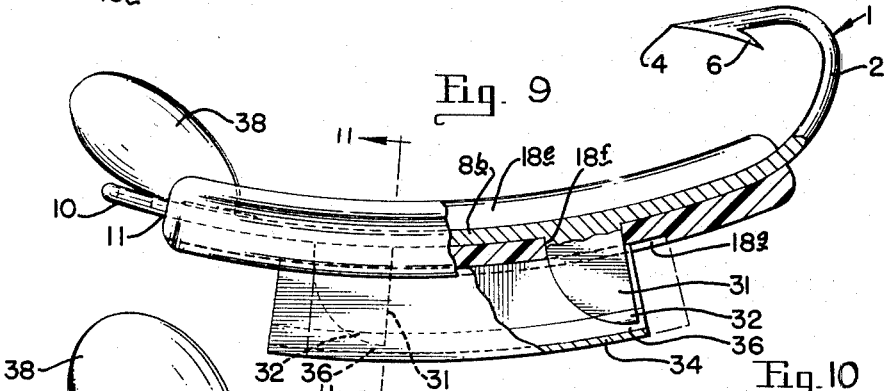
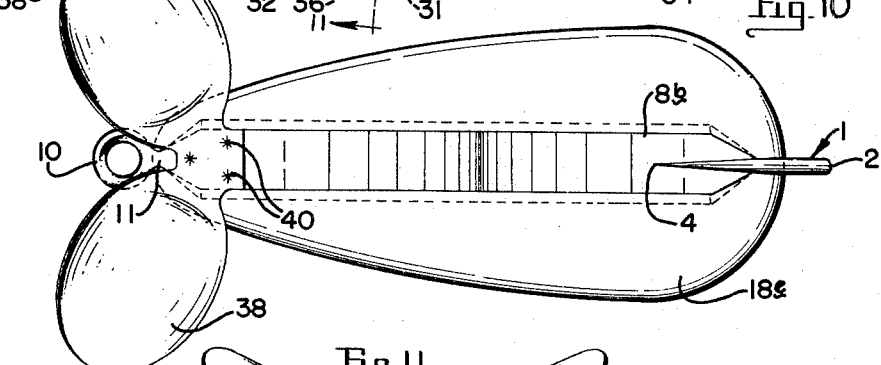
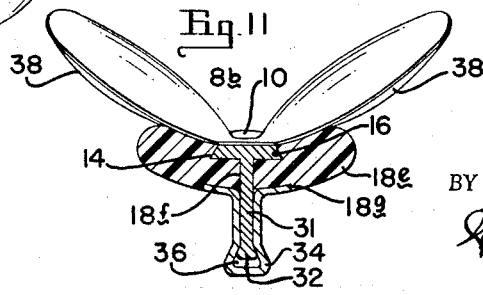
WILLIAM R. McPHERSON
INVENTOR.
BY
*Wayland D. Keith*
HIS AGENT

United States Patent Office 3,395,480
Patented Aug. 6, 1968

3,395,480
FISH HOOKS AND LURES
William R. McPherson, P.O. Box 1044,
Vernon, Tex. 76384
Filed Oct. 12, 1965, Ser. No. 495,176
5 Claims. (Cl. 43—42.09)

ABSTRACT OF THE DISCLOSURE

A fish hook constructed so as to enable various lures to be readily and quickly attached thereto and detached therefrom to enable the desired lure to be used to fit the occasion. The fish hook is formed with an elongated, flattened shank portion and has means thereon to complementally engage and be detachably secured to other means on a fishing lure body. The hook shank preferably is a longitudinally-curved dove-tail shaped body to engage within a corresponding-shaped groove in the lure body. A weed guard may be provided having an end secured to the hook shank adjacent the hook eye. The lure bodies may be of any desired color and of a density to either float or sink.

---

This invention relates to improvements in fishing apparatus and more particularly to a fish hook to which various lures may be attached.

Various fish hooks and various lures have been proposed heretofore, but these, for the most part, embodied a fish hook and a lure made in a unitary manner or assembled as a unit which did not allow for flexibility in changing the lure, but still using the same hook.

The present fish hook is constructed with an elongated, flattened shank intermediate the hook and the eye thereof to enable lures of various shapes and colors to be readily attached thereto and to be detached therefrom.

The present hook is so designed that it is adaptable to use either floater type lures or lures which sink in the water, depending upon the specific gravity of the lures which are detachably secured to the hook.

An object of the invention is to provide a basic elongated hook to which a lure may be readily attached or detached therefrom.

Another object of the invention is to provide an elongated hook, which hook may be made in any size or shape, so as to be adapted to the particular size fish for which it is being used, and to the type of fishing indicated by existing conditions.

Still another object of the invention is to provide a fish lure wherein various standardized, detachable units of various sizes and shapes may be readily attached to the elongated hook or which may be detached therefrom.

Still another object of the invention is to provide an elongated hook and lure combination, which may be made of plastic or other suitable materials, wherein the various lures have projections thereon to be complementally received through apertures within the body of the hook.

Still another object of the invention is to provide an elongated fish hook having a weed guard thereon, which will prevent weeds from catching thereon from either side of the top thereof as the hook is moved through the water.

Still a further object of the invention is to provide an elongated, curved fish hook to which an elongated curved lure may be attached, which hook-lure combination is so constructed that it will readily glide through the water on the surface thereof when reeled in with a fishing line.

Yet another object of the invention is to provide an elongated hook body to complementally receive a lure thereon.

Still another object of the invention is to provide an elongated fish hook body and lure combination wherein the lure and elongated body are fitted together in dovetailed relation.

Still another object of the invention is to provide an elongated hook body, one portion of the lure being adapted to fit on one side of the body and another portion of the lure is adapted to fit on the other portion of the body thereby to enable one portion of the lure to be interlocked with the other portion of the lure on the opposite side of the elongated hook body.

Still a further object of the invention is to provide an elongated, apertured hook body wherein one portion of the lure is adapted to fit on one side of the hook body and another portion of the lure is adapted to receive projections thereon in interlocking relation, on the opposite side of the hook body, to hold the lure to the hook body.

Still a further object of the invention is to provide an elongated hook and body which is flattened intermediate the ends thereof to receive a lure thereon, and whereby means is provided to interlock with the hook body to secure the lure in fixed relation thereto.

And still another object of the invention is to provide a fishing lure which is interlocked with the body of an elongated hook, with means to shift the interlocking member, which means form a weight, so as to change the position of the fishing lure with respect to the surface of the water.

And still another object of the invention is to provide an elongated hook body having spoon-like members on the end thereof so as to create certain unusual movements of the lure while it is being drawn through the water in reeled relation.

Another object of the invention is to provide an elongated hook body, to which various lures may be attached, that is low in the cost of manufacture, sturdy in construction, and easy to assemble and disassemble.

With these objects in view and others which will become manifest as the description proceeds, reference is to be had to the accompanying drawings in which like reference characters designate like parts in the several views thereof, in which:

FIG. 1 is a perspective view of the basic elongated hook shown apart from a lure;

FIG. 1A is a perspective view similar to FIG. 1, but showing a lure attached thereto;

FIG. 2 is a longitudinal, sectional view taken on line 2—2 of FIG. 3, looking in the direction indicated by the arrows;

FIG. 3 is a top plan view of the hook and lure arrangement as shown in FIG. 1A;

FIG. 4 is a sectional view taken on line 4—4 of FIG. 2, looking in the direction indicated by the arrows;

FIG. 5 is a sectional view taken on line 5—5 of FIG. 2, looking in the direction indicated by the arrows;

FIG. 6 is an elevational view of a modified form of the hook and lure;

FIG. 7 is a sectional view taken on line 7—7 of FIG. 6, looking in the direction indicated by the arrows;

FIG. 8 is a sectional view taken on line 8—8 of FIG. 6, looking in the direction indicated by the arrows;

FIG. 9 is an elevational view of a modified form of the invention with parts broken away and with parts shown in section to bring out the details of construction;

FIG. 10 is a top plan view of the form of the invention as shown in FIG. 9; and

FIG. 11 is a sectional view taken on line 11—11 of FIG. 9, looking in the direction indicated by the arrows.

With more detailed reference to the drawings, the numeral 1 designates generally the basic elongated fish hook and body, which has a hook portion 2 having the usual point 4 and a hook barb 6, as is well known in the art of fish hooks. The fish hook body 8 is flattened for a spaced distance intermediate the hook 2 and an eye 10. The flattened body portion 8 has spaced apertures 12 formed therein, as will best be seen in FIGS. 1 and 2. The flattened body portion 8 preferably is wider on the bottom than on top, when the hook is in the position as shown in FIGS. 1 through 5, which widened portion forms a dovetail 14, which is adapted to complementally engage a dovetail recess 16 in lure 18, as will best be seen in FIGS. 4 and 5.

The hook body 8 has a weed guard 20 secured thereto adjacent the eye 10, which weed guard stands upward and surrounds point 4 of the hook 2 so as to prevent weeds or other objects from engaging the point 4 of the hook, while the hook is being moved through the water.

The hook body 1, in FIGS. 1 through 5 and 9 through 11, is shown to be curved, with the convex side being opposite the point 4 of the hook. The lure 18 may be molded to conform to the curvature of the body 8 and may be molded with a dovetail 16, which is undercut so that when projections 22 on the lure are pressed through apertures 12 in the elongated, flattened body portion 8, the upper surface of the elongated hook body 8 will be substantially flush with the upper side of the lure 18. The elongated body is preferably swaged or tapered, as indicated at 7 and 9, at each end of the flattened portion thereof to form a transition with the stem 11 and the hook portion 2, respectively.

It is preferable to have the lure 18, when used as a floater lure, curved longitudinally and transversely to form a boat-like shape, the lure also being rounded on the ends and sides thereof so that the particular shape of the lure, when pulled by a fish line, as by reeling in, will cause the lure to skip and glide on the surface of the water to attract the attention of game fish. The weed guard 20 is sufficiently rigid to prevent the hook from engaging weeds; however, it is sufficiently resilient, so that when a fish strikes the lure, the V-portion 24 of the weed guard 20 will move downwardly to permit the point 4 of the hook to engage the fish in the customary manner. While the lure 18 is shown to be made of yieldable plastic, it can be made of plastic of a density which will either float or sink, or other materials may be used, such as rubber or the like, and the lure may be of one solid color, or it may be decorated to simulate various objects so as to arouse the fighting instincts of game fish.

SECOND FORM OF THE INVENTION

A second form of the invention is shown in FIGS. 6 through 8, which form of the invention has a hook portion 2, a conventional point 4, which hook 4 has a barb 6 of the same character as the above-mentioned form of the invention. An elongated, flattened body portion 8a extends between the hook portion and a reduced stem portion 11. An eye 10 is formed integral with the reduced stem portion 11. The body portion 8a has apertures 12a therein to enable the lure to be secured thereto.

The lure is comprised of two parts, an upper portion 18a and a lower portion 18b. The upper portion 18a may be formed of plastic or other suitable material, and which has projections 22a thereon which are adapted to extend through the apertures 12a and into complementary holes formed in the lower portion 18b, as will best be seen in FIGS. 7 and 8. The projections 22a preferably have the outer end thereof enlarged to frictionally engage within a hole 22b in complementary lure portion 18b. The present lure is shown to be covered with a hair-like material 18c on the upper portion 18a and with a hair-like material 18d on the lower portion of the lure 18b, and when the lure portions 18a and 18b are mated together on opposite sides of an elongated body 8a of the hook 2, it presents what is generally known in the fishing art as a "bucktail," or streamer fly.

The hair-like material 18c and 18d may be of brilliant colors which are conducive to attracting game fish; however, it is well known in the art of fishing that different color buck-tails attract different game fish, and also different colors are used to attract game fish at different seasons. Therefore, the array of colors of the buck-tails 18c and 18d may present a great assortment of lures, but only a single hook is needed, as any color assortment or combination of colors within the range of the supply of buck-tail components 18c and 18d, may be provided. Therefore, these buck-tail components 18c and 18d may be readily and conveniently carried without any special hook encasement units to prevent injury from hooks. Furthermore, other type lures may be provided which have interlocking body portions to form an elongated lure, which may be decorated in any manner, either in solid colors, or in a variety of colors, or to simulate animate objects, either with or without the buck-tail hair being provided thereon.

While the elongated body 8a is shown to be relatively straight, it is to be pointed out it may be curved in a manner as shown in FIGS. 1 through 3, is so desired.

THIRD FORM OF THE INVENTION

A third form of the invention is shown in FIGS. 9 through 11, wherein a hook 2, which has the usual point 4 and barb 6, and which has an elongated body 8b intermediate the hook 2 and the reduced neck portion 11 which is adjacent the eye 10. It is preferable to have the elongated, flattened portion 8b with downwardly extending projections 31 intermediate the sides of elongated body portion 8b, which projections 31 are made integral with the elongated body 8b and extend downwardly from the side of the body 8b opposite the point 4 of hook 2. The lower end of the projections 31 is thickened as indicated at 32 to complementally engage a retainer clip 34 which is formed to complementally engage the projection 31 and the thickened portion 32 so that the clip 34, which is preferably made of yieldable material such as metal or plastic, will engage the projection 32 so that the enlarged end portion 32 will be fitted within an enlarged groove 36, as will best be seen in FIGS. 9 and 11.

The elongated body 8b of the hook is pressed downwardly with projections 31 extending through apertures 18f in lure 18e and the body 8b, which is of a dovetailed shape as indicated at 14, complementally engages a dovetailed recess 16 in the lure 18e. In this manner the upper face of body 8b will fit substantially flush with the upper surface of lure 18e, as will best be seen in FIG. 11.

The projections 31 will extend below the bottom of lure 18e and the clip 32 may interfit longitudinally on to the projections 31 as by sliding the clip longitudinally from the eye end with a recess 18g into the position as shown in full outline in FIGS. 9 and 11. It is preferable that this clip 34 be made of metallic material that is weighted to such extent that by shifting the clip 34 from the position as shown in full outline to that shown in dashed outline in FIG. 9 the lure 18 will take different positions in the water and present different movements. This is especially due to the fact that fantail spoons 38 are positioned on each side of the elongated body 8b near the eye end thereof, which spoons preferably have upwardly facing concave members which will cut the water in different ways when the clip 34 is shifted to alternate positions. These spoons are preferably made of a unitary piece of metal or plastic and secured to the elongated hook body 8b as by spot welding, as indicated at 40, or by any other manner of attachment depending upon the material used.

With the body of the lure 18e is of an elongated, oval shape with upturned sides and upturned ends, it is to be understood that this may be made in various sizes and shapes, and made of various colors, and either of a material of a specific gravity heavier than water so it will sink or of a density lighter than water so it will float or skim along on the surface of the water. Furthermore, the material may be made of solid or variegated colors or it may be decorated to simulate animate objects, or in other ways so as to attract game fish to strike the lure.

While a weed guard has not been shown in this form of the invention, it is to be understood that this form of the invention is also adaptable for use with a weed guard such as shown in FIGS. 1 through 5.

Having thus clearly shown and described the invention, what is claimed as new and desired to be secured by Letters Patent is:

1. A fish hook comprising;
   (a) an elongated, unitary, flattened body,
   (b) a pointed hook formed integrally with one end of said body,
   (c) a barb formed on said hook near the terminal end thereof,
   (d) an eye formed on the opposite end of said body integrally therewith,
      (1) said elongated, unitary, flattened body being apertured within the length thereof,
      (2) an elongated lure detachably fitted on said body in complemental relation therewith and having means interengaging said apertures.

2. A fish hook comprising;
   (a) an elongated, unitary, flattened body,
      (1) said elongated, one piece, flattened body being apertured within the length thereof,
   (b) a pointed hook formed integrally with one end of said body,
   (c) a barb formed on said hook near the terminal end thereof,
   (d) an eye formed on the opposite end of said body integrally therewith,
   (e) an elongated, plastic lure,
      (1) a projection formed on a side of said elongated plastic lure, which projection is adapted to complementally engage the said aperture in said elongated, flattened body.

3. A fish hook as defined in claim 2 wherein
   (a) said elongated, plastic lure has a groove formed therein longitudinally thereof,
      (1) said elongated, plastic lure having longitudinal convex and concave curves throughout the length thereof,
      (2) said elongated, plastic lure having transverse, convex and concave curves throughout the width thereof,
   (b) said elongated, unitary, flattened body having a convex curve throughout the length thereof to complementally fit within said groove in said elongated, plastic lure.

4. A fish hook comprising;
   (a) an elongated, unitary, flattened body,
      (1) a pointed hook formed integrally with one end of said body,
      (2) a barb formed on said hook near the terminal end thereof,
      (3) an eye formed on the opposite end of said body integrally therewith,
      (4) one side of said elongated, flattened body being wider than the opposite side thereof, to form a member of dovetail cross section,
   (b) an elongated, floatable, resilient, plastic lure,
      (1) said elongated, floatable, resilient, plastic lure, having a medial groove formed longitudinally thereof, which groove is adapted to complementally receive said elongated, unitary, flattened, dovetail body in interlocking relation upon deformation of said elongated, floatable, resilient plastic lure about a longitudinal axis,
      (2) said elongated, unitary, flattened, dovetail body being tapered at each end to join with the respective eye portion and hook portion of the fish hook.

5. A fish hook as defined in claim 4; wherein
   (a) said elongated, unitary, flattened, dovetail body is curved about a longitudinal axis, and
   (b) said elongated unitary, floatable, resilient, plastic lure having means adapted to complementally engage said aperture in said elongated, flattened, dovetail body, and
      (1) said elongated, floatable, resilient, plastic lure being lighter in density than water.

References Cited

UNITED STATES PATENTS

| | | | |
|---|---|---|---|
| 2,255,222 | 9/1941 | Leusch | 43—42.43 |
| 2,587,736 | 3/1952 | Kindscher | 43—42.09 |
| 2,758,408 | 8/1956 | Murphy et al. | 43—42.09 |
| 2,784,518 | 3/1957 | Boyer | 43—44.91 |
| 3,241,262 | 3/1966 | Beverly | 43—44.91 |

SAMUEL KOREN, *Primary Examiner.*

W. J. LEACH, *Assistant Examiner.*